US011802809B2

(12) United States Patent
Okamoto et al.

(10) Patent No.: US 11,802,809 B2
(45) Date of Patent: *Oct. 31, 2023

(54) BACKSCATTERING OPTICAL AMPLIFICATION DEVICE, OPTICAL PULSE TESTING DEVICE, BACKSCATTERING OPTICAL AMPLIFICATION METHOD AND OPTICAL PULSE TESTING METHOD

(71) Applicant: NIPPON TELEGRAPH AND TELEPHONE CORPORATION, Tokyo (JP)

(72) Inventors: Keiji Okamoto, Musashino (JP); Atsushi Nakamura, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 329 days.

This patent is subject to a terminal disclaimer.

(21) Appl. No.: 17/281,186

(22) PCT Filed: Sep. 18, 2019

(86) PCT No.: PCT/JP2019/036638
§ 371 (c)(1),
(2) Date: Mar. 29, 2021

(87) PCT Pub. No.: WO2020/071128
PCT Pub. Date: Apr. 9, 2020

(65) Prior Publication Data
US 2021/0396626 A1 Dec. 23, 2021

(30) Foreign Application Priority Data
Oct. 2, 2018 (JP) .................... 2018-187260

(51) Int. Cl.
*G01M 11/02* (2006.01)
*H01S 3/30* (2006.01)
(Continued)

(52) U.S. Cl.
CPC ..... *G01M 11/0207* (2013.01); *G01D 5/35361* (2013.01); *G01D 5/35364* (2013.01);
(Continued)

(58) Field of Classification Search
CPC ............ G01M 11/0207; G01M 11/31; G01M 11/3109; G01M 11/3118; G01M 11/3127;
(Continued)

(56) References Cited

U.S. PATENT DOCUMENTS 6,819,412 B2 * 11/2004 Glingener ............ G01M 11/319
356/73.1
7,692,849 B2 * 4/2010 Shukunami .......... G01M 11/319
359/337
(Continued)

FOREIGN PATENT DOCUMENTS

JP 2017003338 A * 1/2017

OTHER PUBLICATIONS

Atsushi Nakamura et al., High-sensitivity detection of fiber bends: 1-μm-band mode-detection OTDR, J. Lightw. Technol, vol. 33, No. 23, 2015, pp. 4862-4869.
(Continued)

*Primary Examiner* — Gordon J Stock, Jr.
(74) *Attorney, Agent, or Firm* — Harness, Dickey & Pierce, P.L.C.

(57) ABSTRACT

The present invention is to provide a backscattered light amplification device, an optical pulse test apparatus, a backscattered light amplification method, and an optical pulse test method for amplifying a desired propagation mode of Rayleigh backscattered light with a desired gain by
(Continued)

stimulated Brillouin scattering in a fiber under test having the plurality of propagation modes. The backscattered light amplification device according to the present invention is configured to control individually power, incident timing, and pulse width of a pump pulse for each propagation mode when the pump pulse is incident in a plurality of propagation modes after the probe pulse is input to the fiber under test in any propagation mode.

6 Claims, 4 Drawing Sheets

(51) Int. Cl.
- H04B 10/071 (2013.01)
- H04B 10/2537 (2013.01)
- G01M 11/00 (2006.01)
- G01D 5/353 (2006.01)

(52) U.S. Cl.
CPC ...... *G01M 11/319* (2013.01); *G01M 11/3109* (2013.01); *H01S 3/30* (2013.01); *H04B 10/071* (2013.01); *H04B 10/2537* (2013.01)

(58) Field of Classification Search
CPC ......... G01M 11/3136; G01M 11/3145; G01M 11/3154; G01M 11/3163; G01M 11/3172; G01M 11/3181; G01M 11/319; H01S 3/0912; H01S 3/30; H01S 3/302; H04B 10/071; H04B 10/2537; H04B 10/2916; G01D 5/35354; G01D 5/35358; G01D 5/35361; G01D 5/35364

See application file for complete search history.

(56) References Cited

U.S. PATENT DOCUMENTS

| | | | |
|---|---|---|---|
| 8,926,173 B2* | 1/2015 | Lee | G01M 11/319 374/161 |
| 10,753,824 B2* | 8/2020 | Rapp | G01M 11/319 |
| 11,085,800 B2* | 8/2021 | Rowen | H04B 10/2916 |
| 11,402,295 B2* | 8/2022 | Oda | G01M 11/39 |
| 11,467,060 B2* | 10/2022 | Nakamura | G01M 11/3127 |
| 11,486,791 B2* | 11/2022 | Okamoto | H04B 10/071 |
| 2022/0260454 A1* | 8/2022 | Oda | G01M 11/319 |

OTHER PUBLICATIONS

Atsushi Nakamura et al., Loss Cause Identification by Evaluating Backscattered Modal Loss Ratio Obtained With 1-μm-Band Mode-Detection OTDR, J. Lightw. Technol, vol. 34, No. 15, 2016, pp. 3568-3576.

David Mermelstein et al., Brillouin amplification and processing of the Rayleigh scattered signal, Opt. Lett, vol. 40, No. 14, 2015, pp. 3340-3343.

Kwang Yong Song and Yong Hyun Kim, Characterization of stimulated Brillouin scattering in a few-mode fiber, Opt. Lett, vol. 38, No. 22, 2013, pp. 4841-4844.

* cited by examiner

BACKSCATTERING OPTICAL AMPLIFICATION DEVICE, OPTICAL PULSE TESTING DEVICE, BACKSCATTERING OPTICAL AMPLIFICATION METHOD AND OPTICAL PULSE TESTING METHOD

This application is a 371 U.S. National Phase of International Application No. PCT/JP2019/036638 filed on Sep. 18, 2019, which claims priority to Japanese Application No. 2018-187260 filed on Oct. 2, 2018.

TECHNICAL FIELD

The present disclosure relates to a backscattered light amplification device and a backscattered light amplification method for amplifying backscattered light in an optical pulse test used to detect characteristics of an optical fiber, and relates to an optical pulse test apparatus and an optical pulse test method using the same.

BACKGROUND ART

An optical pulse test method (herein, also referred to as an optical time domain reflectometer; OTDR) is well known as a test technique for an optical fiber. The OTDR indicates a method and a device that makes pulsed test light incident on a fiber under test (hereinafter, referred to as FUT) and acquires distribution data (OTDR waveform) based on intensity and round trip time of backscattered light of Rayleigh scattered light derived from a test light pulse propagating in an optical fiber and Fresnel reflection light. Such a technique can be used to detect an abnormal position at which breakage or increase in loss of the optical fiber occurs and to specify the position.

In Non-Patent Literature 1, a first higher-order mode (LP11 mode) of backscattered light is extracted using a wavelength region in which a general single-mode fiber (hereinafter, referred to as SMF) operates in two modes, and a technique (1-μm-band mode-detection OTDR) is disclosed which detects an optical fiber bending with higher sensitivity than a general-purpose OTDR. Furthermore, Non-Patent Literature 2 discloses a method of measuring both a fundamental mode (LP01 mode) and LP11 mode of backscattered light in a 1-μm-band mode-detection OTDR, evaluating the ratio of loss occurring in the modes, and identifying factors of the loss occurring in the optical fiber.

CITATION LIST

Non-Patent Literature

Non-Patent Literature 1: A. Nakamura, K. Okamoto, Y. Koshikiya, T. Manabe, M. Oguma, T. Hashimoto and M. Itoh, "High-sensitivity detection of fiber bends: 1-μm-band mode-detection OTDR", J. Lightw. Technol., vol. 33, no. 23, pp. 4862-4869, 2015.

Non-Patent Literature 2: A. Nakamura, K. Okamoto, Y. Koshikiya, T. Manabe, M. Oguma, T. Hashimoto, and M. Itho, "Loss Cause Identification by Evaluating Backscattered Modal Loss Ratio Obtained With 1-μm-Band Mode-Detection OTDR", J. Lightw. Technol., vol. 34, no. 15, pp. 3568-3576, 2016.

Non-Patent Literature 3: David Mermelstein, Eliashiv Shacham, Moran Biton, and Shmuel Sternklar, "Brillouin amplification and processing of the Rayleigh scattered signal," Opt. Lett. vol. 40, pp. 3340-3343, 2015.

Non-Patent Literature 4: Kwang Yong Song and Yong Hyun Kim, "Characterization of stimulated Brillouin scattering in a few-mode fiber," Opt. Lett. vol. 38, pp. 4841-4844, 2013.

SUMMARY OF THE INVENTION

Technical Problem

Non-Patent Literature 3 proposes a method, as a method of expanding a measurement distance in OTDR measurement, of amplifying distributedly in FUT backscattered light generated by a probe pulse propagating in FUT using pump light having a frequency (short wavelength) higher by the Brillouin frequency shift.

However, when the FUT is a two-mode region of Few-mode optical fiber having a plurality of propagation modes and a general SMF, it is known (Non-Patent Literature 4) that an amplification gain due to stimulated Brillouin scattering may differ depending on two propagation modes of light interacting with each other, and there is a problem in OTDR measurement in the two-mode region of the Few-mode optical fiber and the general SMF that a method of amplifying a desired propagation mode of the backscattered light with a desired gain through stimulated Brillouin scattering is unclear.

Therefore, in order to solve the above-described problem of the related art, the present invention is to provide a backscattered light amplification device, an optical pulse test apparatus, a backscattered light amplification method, and an optical pulse test method in which a desired propagation mode of Rayleigh backscattered light is amplified with a desired gain by stimulated Brillouin scattering in the fiber under test having a plurality of propagation modes.

Means for Solving the Problem

In order to achieve the above object, a backscattered light amplification device according to the present invention is configured to control individually power, incident timing, and pulse width of the pump pulse for each propagation mode when the pump pulse is incident in a plurality of propagation modes after the probe pulse is input to a fiber under test in any propagation mode.

Specifically, a backscattered light amplification device according to the present invention includes:
a probe pulse incidence means for making a probe pulse incident on one end of a fiber under test in a desired propagation mode;
a pump pulse incidence means for making a pump pulse, which generates a Brillouin gain spectrum in an optical frequency range including an optical frequency of the probe pulse, incident on the one end of the fiber under test in a plurality of propagation modes after the probe pulse incidence means makes the probe pulse incident on the fiber under test; and
a control means for setting a power ratio of the pump pulse between the propagation modes, a length of the pump pulse in each of the propagation modes, and a relative time difference between the probe pulse incident on the fiber under test and the pump pulse in each of the propagation modes so as to give a desired Brillouin amplification gain to backscattered light of a desired propagation mode generated at a spot far from a desired spot of the fiber under test, among backscattered light of a plurality of propagation modes generated from the probe pulse propagating in the fiber under test.

A backscattered light amplification method according to the present invention includes:

a probe pulse incidence procedure for making a probe pulse incident on one end of a fiber under test in a desired propagation mode;

a pump pulse incidence procedure for making a pump pulse, which generates a Brillouin gain spectrum in an optical frequency range including an optical frequency of the probe pulse, incident on the one end of the fiber under test in a plurality of propagation modes after the probe pulse is incident on the fiber under test in the probe pulse incidence procedure; and a control procedure for setting a power ratio of the pump pulse between the propagation modes, a length of the pump pulse in each of the propagation modes, and a relative time difference between the probe pulse incident on the fiber under test and the pump pulse in each of the propagation modes so as to give a desired Brillouin amplification gain to backscattered light of a desired propagation mode generated at a spot far from a desired spot of the fiber under test in the pump pulse incidence procedure, among backscattered light of a plurality of propagation modes generated from the probe pulse propagating in the fiber under test.

Since the power, incident timing, and pulse width of the pump pulse are individually controlled for each propagation mode, it is possible to give an arbitrary Brillouin amplification gain from any spot (spot in a longitudinal direction of the fiber under test) to a desired propagation mode of the backscattered light generated by the probe pulse.

Accordingly, the present invention can provide the backscattered light amplification device and the backscattered light amplification method for amplifying the desired propagation mode of the Rayleigh backscattered light with a desired gain by stimulated Brillouin scattering in the fiber under test having the plurality of propagation modes.

The backscattered light amplification device according to the present invention further includes a mode demultiplexing means for separating the backscattered light returning to the one end of the fiber under test for each propagation mode.

The backscattered light amplification method according to the present invention further includes a mode demultiplexing procedure for separating the backscattered light returning to the one end of the fiber under test for each propagation mode.

An optical pulse test apparatus according to the present invention includes:

the backscattered light amplification device; and an arithmetic processing device that acquires, for each propagation mode, a light intensity distribution in a length direction of the fiber under test from the backscattered light returning to the one end of the fiber under test, wherein the arithmetic processing device is configured to operate the backscattered light amplification device to acquire a first light intensity distribution when the probe pulse and the pump pulse are incident on the fiber under test, operate the pump pulse incidence means and the mode demultiplexing means of the backscattered light amplification device to acquire a second light intensity distribution when only the pump pulse is incident on the fiber under test, and subtract, for each propagation mode, the second light intensity distribution from the first light intensity distribution to acquire a third light intensity distribution that would occur when only the probe pulse is incident on the fiber under test.

An optical pulse test method according to the present invention of performing:

the backscattered light amplification method;

an arithmetic processing method of acquiring, for each propagation mode, a light intensity distribution in a length direction of the fiber under test from the backscattered light returning to the one end of the fiber under test, the optical pulse test method comprising of:

using the backscattered light amplification method and the arithmetic processing method to acquire a first light intensity distribution when the probe pulse and the pump pulse are incident on the fiber under test;

using the pump pulse incidence procedure and the mode demultiplexing procedure of the backscattered light amplification method and the arithmetic processing method to acquire a second light intensity distribution when only the pump pulse is incident on the fiber under test; and subtracting, for each propagation mode, the second light intensity distribution from the first light intensity distribution to acquire a third light intensity distribution that would occur when only the probe pulse is incident on the fiber under test.

In the backscattered light amplification device and method, it is possible to exclude the backscattered light component of the pump pulse, which is a noise component, and to observe the backscattered light in the desired propagation mode.

The inventions described above can be combined as much as possible.

Effects of the Invention

The present invention can provide a backscattered light amplification device, an optical pulse test apparatus, a backscattered light amplification method, and an optical pulse test method in which a desired propagation mode of Rayleigh backscattered light is amplified with a desired gain by stimulated Brillouin scattering in a fiber under test having a plurality of propagation modes.

DESCRIPTION OF EMBODIMENTS

Figure 1:
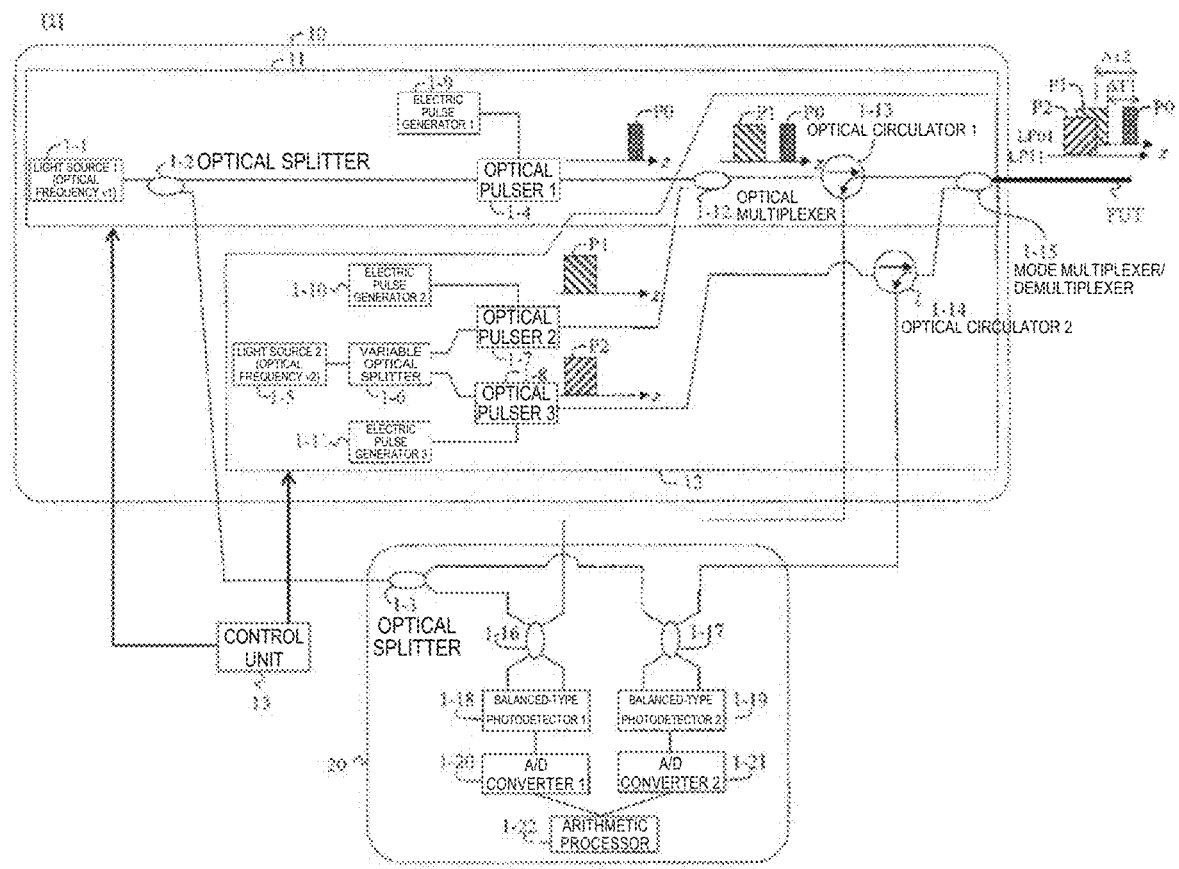
FIG. 1 is a diagram illustrating a configuration of an optical pulse test apparatus according to the present invention.

An embodiment of the present invention will be described with reference to the accompanying drawings. The embodiment described below is an example of the present invention, and the present invention is not limited to the following embodiment. In the description and the drawings, components having the same reference numerals indicate the same components.

FIG. 1 is a diagram illustrating an optical pulse test apparatus of a present embodiment. In the embodiment, it is assumed that a fiber under test propagates only two propagation modes of a fundamental mode and a first higher-order mode and a propagating light is in a single polarization state. The optical pulse test apparatus includes a backscattered light amplification device 10 and an arithmetic processing device 20 which acquires a light intensity distribution in a length direction of a fiber under test FUT in every propagation mode, from the backscattered light that returns to one end of the fiber under test FUT The backscattered light amplification device 10 includes;
a probe pulse incidence means 11 for making a probe pulse P0 incident on one end of a first under test FUT in a desired propagation mode;
a pump pulse incidence means 12 for making pump pulses P1 and P2, which generate a Brillouin gain spectrum in an optical frequency range including an optical frequency of the probe pulse P0, incident on the one end of the fiber under test FUT in a plurality of propagation modes after the probe pulse incidence means 11 makes the probe pulse P0 incident on the fiber under test FUT; and
a control means 13 for setting a power ratio of the pump pulse between the propagation modes, a length of the pump pulse in each of the propagation modes, and relative time differences ΔT1 and ΔT2 between the probe pulse P0 incident on the fiber under test FUT and the pump pulse in each of the propagation modes so as to give a desired Brillouin amplification gain to backscattered light of a desired propagation mode generated at a spot far from a desired spot of the fiber under test FUT, among backscattered light of a plurality of propagation modes generated from the probe pulse P0 propagating in the fiber under test FUT.

The backscattered light amplification device 10 further includes a mode demultiplexing means (mode multiplexer/demultiplexer 1-15) for separating the backscattered light returning to the one end of the fiber under test FUT for each propagation mode.

In FIG. 1, reference numeral 1-1 indicates a first light source that emits light of optical frequency ν1, reference numerals 1-2 and 1-3 indicate optical splitters that split the light emitted from the first light source, reference numeral 1-4 indicates a first optical pulser configured to pulse one of the split light emitted from the first light source to generate a probe pulse, reference numeral 1-5 indicates a second light source that emits light of optical frequency ν2, reference numeral 1-6 indicates a variable optical splitter that splits the light emitted from the second light source at a desired ratio, reference numerals 1-7 and 1-8 indicate a second and third optical pulsers configured to pulse the light split by the variable optical splitter to generate first and second pump pulses, reference numerals 1-9, 1-10 and 1-11 indicate electric pulse generators that generate an electric pulse for modulating the light input to each of the first, second and third optical pulsers, reference numeral 1-12 indicates an optical multiplexer that multiplexes the probe pulse and the first pump pulse, reference numeral 1-13 indicates a first optical circulator that divide a fundamental mode component of the backscattered light, reference numeral 1-14 indicates a second optical circulator that divide a first higher-order mode component of the backscattered light, reference numeral 1-15 indicates a mode multiplexer/demultiplexer configured to make the multiplexed probe pulse and first pump pulse, and the second pump pulse incident on the fiber under test in the fundamental mode and the first higher-order mode, respectively, and to separate the backscattered light from the fiber under test into the fundamental mode component and the first higher-order mode component, reference numeral 1-16 indicates an optical multiplexer configured to multiplex the light emitted from the first light source split by the optical splitters 1-2 and 1-3 with the fundamental mode component of the backscattered light, reference numeral 1-17 indicates an optical multiplexer configured to multiplex the light emitted from the first light source split by the optical splitters 1-2 and 1-3 with the first higher-order mode component of the backscattered light, reference numerals 1-18 and 1-19 indicate balanced-type photodetectors, reference numerals 1-20 and 1-21 indicate A/D converters, and reference numeral 1-20 indicates a arithmetic processor.

A probe pulse incidence means 11 includes the first light source 1-1, the optical splitter 1-2, the first optical pulser 1-4, the electric pulse generator 1-9, the optical multiplexer 1-12, the first optical circulator 1-13, and the mode multiplexer/demultiplexer 1-15.

A pump pulse incidence means 12 includes the second light source 1-5, the variable optical splitter 1-6, the second optical pulser 1-7, the third optical pulser 1-8, the electric pulse generator 1-10, the electric pulse generator 1-11, the optical multiplexer 1-12, the first optical circulator 1-13, the second optical circulator 1-14, and the mode multiplexer/demultiplexer 1-15.

A control means 13 controls the variable optical splitter 1-6, the electric pulse generator 1-9, the electric pulse generator 1-10, and the electric pulse generator 1-11.

An arithmetic processing device 20 includes the optical splitter 1-3, the optical multiplexers 1-16 and 1-17, the balanced-type photodetectors 1-18 and 1-19, the A/D converters 1-20 and 1-21, and the arithmetic processor 1-22.

Further, since the gain bandwidth due to stimulated Brillouin scattering is relatively narrow, the optical pulse test apparatus according to the present invention uses a narrow linewidth laser having a narrow spectral linewidth for a first light source that is a probe pulse light source, so that the Rayleigh backscattered light of the probe pulse is sufficiently covered by the gain bandwidth. Therefore, it is possible to use heterodyne detection that is advantageous for dynamic range expansion (longer-distance measurement) of the OTDR measurement.

A description will be theoretically given with respect to the fact that the backscattered light amplification device 10 can amplify any desired propagation mode of backscattered light generated by a probe pulse by controlling the gain of the stimulated Brillouin scattering generated by the first and second pump pulses.

The light having the optical frequency ν1 emitted from the first light source 1-1 is split into probe light and local oscillation light by the optical splitter 1-2, the probe light is pulsed by the optical pulser 1-4 based on the electric signal generated by the electric pulse generator 1-9 to generate a probe pulse. On the other hand, the light having the optical frequency ν2 emitted from the second light source 1-5 is split by the variable optical splitter 1-6 at a desired ratio, and is pulsed by the optical pulsers 1-7 and 1-8 based on the electric signals generated by the electric pulse generators 1-10 and 1-11, respectively to generate first and second pump pulses. A frequency difference (Δν=ν2−ν1) between the optical frequency ν1 of the probe pulse and the optical frequency ν2 of the first and second pump pulses is set to match the Brillouin gain band of the fiber under test.

The first pump pulse is multiplexed with the probe pulse by the optical multiplexer 1-12, and is input to the mode multiplexer/demultiplexer 1-15 by passing through the first optical circulator 1-13. The second pump pulse is input to the mode multiplexer/demultiplexer 1-15 by passing through the second optical circulator 1-14.

Figure 2:
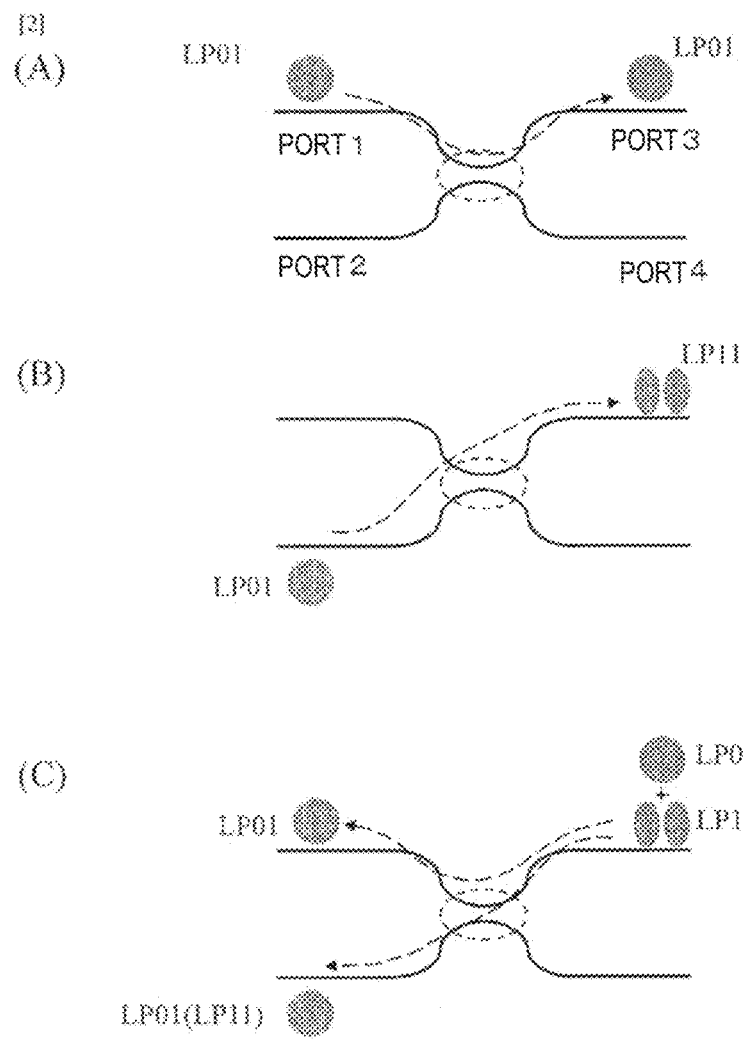
FIG. 2 is a diagram illustrating a mode multiplexer/demultiplexer included in the optical pulse test apparatus according to the present invention.

The mode multiplexer/demultiplexer 1-15 outputs an LP01 mode, which is input to port 1, to port 3 without change of the LP01 mode as shown in FIG. 2. The mode multiplexer/demultiplexer 1-15 converts an LP01 mode input to port 2 into an LP11 mode and outputs the LP11 mode from port 3. In addition, the mode multiplexer/demultiplexer 1-15 outputs the LP01 mode, which is input to port 3, to port 1 without change of the LP01 mode. The mode multiplexer/demultiplexer 1-15 converts the LP11 mode into the LP01 mode, and outputs the LP01 mode to port 2. When such a mode multiplexer/demultiplexer 1-15 is used in the backscattered light amplification device 10, as described above, the multiplexed probe pulse and first pump pulse can be incident on the fiber under test FUT in the LP01 mode, and the multiplexed second pump pulse can be incident on the fiber under test FUT in the LP11 mode in such a manner that the first optical circulator 1-13 is connected to port 1 and the second optical circulator 1-14 is connected to port 2. Further, when the second optical circulator 1-14 is connected to port 1 and the first optical circulator 1-13 is connected to port 2, contrary to the above description, the multiplexed probe pulse and first pump pulse can be incident on the fiber under test FUT in the LP11 mode, and the multiplexed second pump pulse can be incident on the fiber under test FUT in the LP01 mode.

The multiplexed probe pulse, first pump pulse, and second pump pulse are input from one end of the fiber under test FUT. The probe pulse is incident earlier in time, the first pump pulse is incident in succession with a time delay ΔT1, and the second pump pulse is incident with a time delay ΔT2. A pulse width of the probe pulse, pulse widths of the first and second pump pulses, and the relative time delays ΔT1 and ΔT2 between the probe pulse and the first and second pump pulses can be adjusted by the electric pulse generators 1-9, 1-10, and 1-11.

Figure 3:
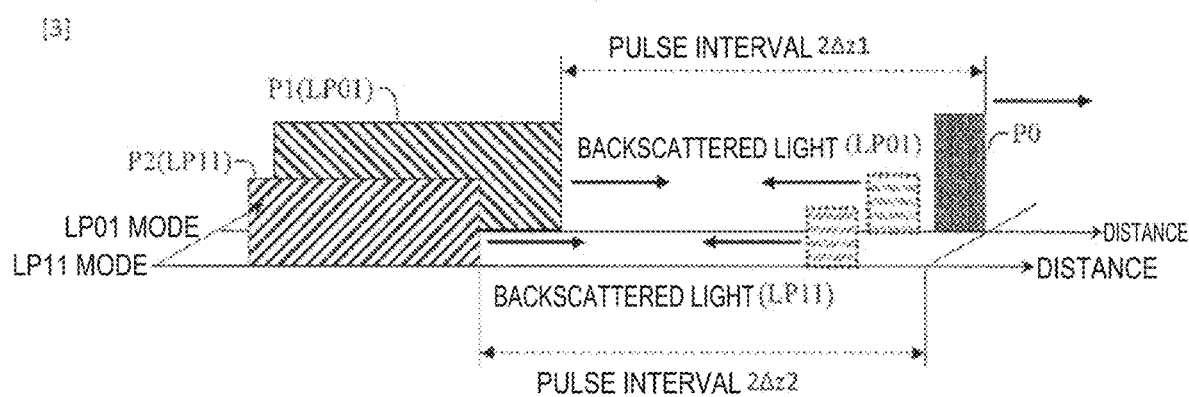
FIG. 3 is a diagram illustrating stimulated Brillouin amplification of a backscattered light amplification device according to the present invention.

As shown in FIG. 3, when the probe pulse and the first and second pump pulses are incident on the fiber under test FUT, backscattered light is generated by the probe pulse incident precedingly. For example, when the wavelength of the probe pulse is in a two-mode region (the fundamental mode and the first higher-order mode can propagate) below the cutoff wavelength of a general single-mode optical fiber, the backscattered light is coupled into the fundamental mode and the first higher-order mode, and propagate toward the input end of the fiber under test FUT. Since Rayleigh scattering is elastic scattering, the optical frequency does not change due to the scattering process, and the generated backscattered light and probe pulse have the same optical frequency ν1.

Subsequently, the first and second pump pulses propagate through the fiber under test FUT while following the probe pulse. When the backscattered light generated by the probe pulse encounters the pump pulse and the backscattered light exists within the Brilloin amplification gain band generated by the pump pulse, stimulated Brilloin amplification of the backscattered light due to the pump pulse occurs, and the backscattered light is amplified.

Figure 4:
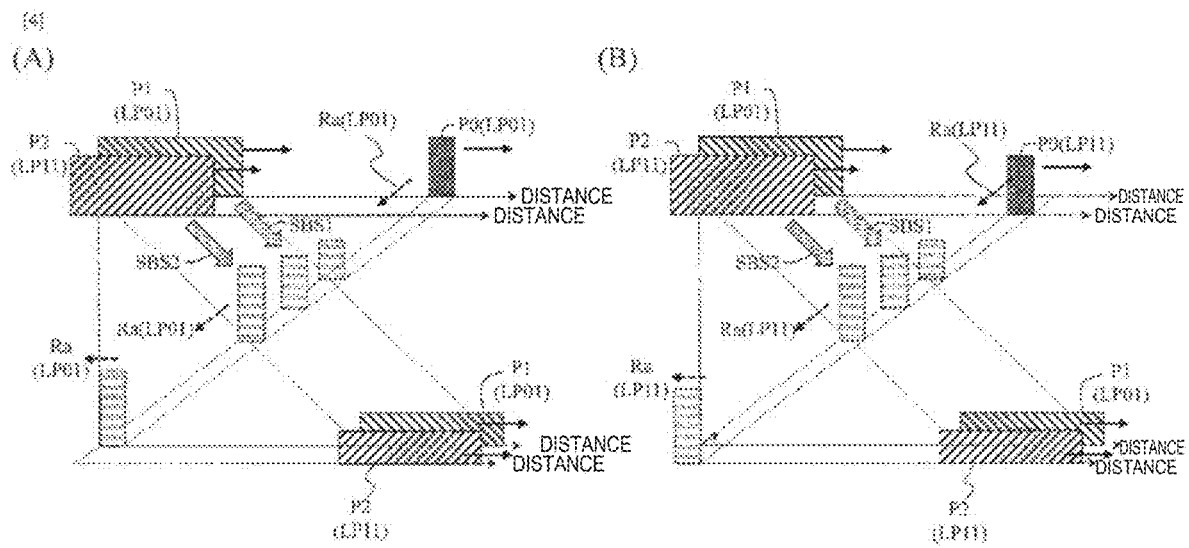
FIG. 4 is a diagram illustrating stimulated Brillouin amplification of a backscattered light amplification device according to the present invention.

As shown in FIG. 4, when the fiber under test FUT is an optical fiber in which a plurality of propagation modes exist or each of the pulses is in a wavelength region where the plurality of propagation modes propagate, the fundamental mode of the backscattered light is subjected to a predetermined Brillouin amplification gain from both the pump pulse (first pump pulse) input in the LP01 mode and the pump pulse (second pump pulse) input in the LP11 mode. In addition, the LP11 mode of the backscattered light is also subjected to a predetermined Brillouin amplification gain from both the pump pulse (first pump pulse) input in the LP01 mode and the pump pulse (second pump pulse) input in the LP11 mode.

After the backscattered light returning to the incident end of the fiber under test FUT is separated into the fundamental mode and the first higher-order mode by the mode multiplexer/demultiplexer 1-15, a fundamental mode component and a first higher-order mode component of the backscattered light are extracted through the circulators 1-13 and 1-14. The light emitted from the first light source split by the optical splitter 1-2 and further split by the optical splitter 1-3 is multiplexed with the fundamental mode component of the backscattered light by the optical multiplexer 1-16, and then the multiplexed light is converted into an electric signal by the balanced-type photodetector 1-18, digitized by the A/D converter 1-20, and analyzed by the arithmetic processor 1-22.

Similarly, the light emitted from the first light source described above is multiplexed with the first higher-order mode component of the backscattered light by the optical multiplexer 1-17, and then the multiplexed light is converted into an electric signal by the balanced-type photodetector 1-19, digitized by the A/D converter 1-21, and analyzed by the arithmetic processor 1-22.

When the input end of the fiber under test FUT is defined as z=0, powers $P_{01}(z)$ and $P_{11}(z)$ of the LP01 mode and the LP11 mode of the backscattered light generated by the probe pulse at a spot z are expressed as follows

[Formula 1]

$$P_{01}(Z) = R_{01\text{-}01} P_0(0) \exp(-\alpha_{01} z) \tag{1}$$

and

[Formula 2]

$$P_{11}(Z) = R_{01\text{-}11} P_0(0) \exp(-\alpha_{01} z) \tag{2}$$

Here, the symbol $P_0(0)$ indicates an optical power at the incident end of the probe pulse, the symbol αn indicates a loss factor of the LP01 mode of the fiber under test FUT, and the symbols $R_{01\text{-}01}$ and $R_{01\text{-}11}$ indicate coupling ratios of the LP01 mode of the probe pulse with respect to the LP01 mode and the LP11 mode of the backscattered light.

The LP01 mode of the backscattered light returning to the input end is subjected to the following Brilloulin amplification G01 from the first (LP01 mode) and second (LP11 mode) pump pulses.

[Formula 3]

$$G_{01} = \exp\{\gamma_{01\text{-}01} \eta P_{pump}^{01}(z-\Delta z_1) \Delta L_1 + \gamma_{11\text{-}01}(1-\eta) P_{pump}^{11}(z-\Delta z_2) \Delta L_2\} \tag{3}$$

Here, the symbols γ01-01 and γ11-01 indicate mode-dependent gain efficiencies in which the LP01 mode of the backscattered light is subjected to a gain from the first (LP01 mode) and second (LP11 mode) pump pulses by stimulated Brillouin scattering. The symbol η indicates a splitting ratio of the variable optical splitter 1-6, that is, a ratio between the powers of the first and second pump pulses.

[Formula 3-1]

$$P_{pump}^{01}(z-\Delta z_1) \tag{3-1}$$

The symbol expressed by Formula 3-1 indicates an optical power of the first (LP01 mode) pump pulse at a spot $z-\Delta z1$.

[Formula 3-2]

$$P_{pump}^{11}(z-\Delta z_2) \quad (3\text{-}2)$$

The symbol expressed by Formula 3-2 indicates an optical power of the second (LP11 mode) pump pulse at a spot $z-\Delta z2$.

The symbols $\Delta L1$ and $\Delta L2$ indicate interaction lengths at which the backscattered light of the probe pulse subjected to the stimulated Brillouin amplification by the first and second pump pulses, and can be adjusted by the pulse width of the pump pulse.

The LP11 mode of the backscattered light is subjected to the following Brillouin amplification G11 from the first (LP01 mode) and second (LP11 mode) pump pulses.

[Formula 4]

$$G_{11} = \exp\{\gamma_{01\text{-}11}\eta P_{pump}^{01}(z-\Delta z_1)\Delta L_1 + \gamma_{11\text{-}11}(1-\eta) P_{pump}^{11}(z-\Delta z_2)\Delta_2\} \quad (4)$$

Here, the symbols $\gamma 01\text{-}11$ and $\gamma 11\text{-}11$ indicate mode-dependent gain efficiencies in which the LP11 mode of the backscattered light is subjected to a gain from the first (LP01 mode) and second (LP11 mode) pump pulses by stimulated Brillouin scattering.

The mode-dependent gain efficiency, that is, Brillouin amplification efficiency between different modes is an overlap integral of a cross-sectional intensity distribution I of an acoustic field n and an optical electric field m, and is represented by the following formula.

[Formula 5]

$$\gamma_{n,m} = \frac{\int\int I_n(x,y)I_m(x,y)dxdy}{\int\int I_n(x,y)dxdy \int\int I_m(x,y)dxdy} \quad (5)$$

This value is uniquely determined by a refractive index profile of the fiber under test FUT.

Distances (½ of the pulse interval) $\Delta z1$ and $\Delta z2$ from the position where the backscattered light of the probe pulse is generated to positions where the backscattered light encounters the first and second pump pulses are expressed by the following formulas using the time delays $\Delta T1$ and $\Delta T2$.

[Formula 6]

$$\Delta z_1 = \frac{c \cdot \Delta T_1}{2} \quad (6)$$

and

[Formula 7]

$$\Delta z_2 = \frac{c \cdot \Delta T_2}{2} \quad (7)$$

Here, the symbol c indicates a speed of light in the fiber under test FUT.

By the control of time intervals $\Delta T1$ and $\Delta T2$ between the probe pulse and the pump pulse, the probe light can be amplified from any spot. The speed of light in the fiber under test FUT slightly changes depending on the propagation mode. However, normally, the pulse width (interaction length with the backscattered light) of the pump pulse is 10 km or more, whereas the change in $\Delta z1$ and $\Delta z2$ caused by the difference in the speed of light of each mode is less than 10 m, and thus the difference in the speed of light for each mode can be ignored.

A power $P_{01}(t)$ of the LP01 mode of the backscattered light generated by the probe pulse observed at a reception unit (z=0) of this device at time t is expressed as follows.

[Formula 8]

$$P_{01}(t) = R_{01\text{-}01}P_0(0)\exp\{-2\alpha_{01}z + \gamma_{01\text{-}01}\eta P_{pump}^{01}(z-\Delta z_1)\Delta L_1 + \gamma_{11\text{-}01}(1-\eta)P_{pump}^{11}(z-\Delta z_2)\Delta L_2\} \quad (8)$$

On the other hand, a power $P_{11}(t)$ of the LP11 mode of the backscattered light is expressed as follows.

[Formula 9]

$$P_{11}(t) = R_{01\text{-}11}P_0(0)\exp\{-(\alpha_{01}+\alpha_{11})z + \gamma_{01\text{-}11}\eta P_{pump}^{01}(z-\Delta z_1)\Delta L_1 + \gamma_{11\text{-}11}(1-\eta)P_{pump}^{11}(z-\Delta z_2)\Delta L_2\} \quad (9)$$

Here, the symbol $\alpha_{11}$ indicates a loss factor of the LP11 mode of the fiber under test FUT. Further, the following formula is satisfied.

[Formula 10]

$$z = \frac{c \cdot t}{2} \quad (10)$$

As indicated in Formulas (8) and (9), by the control of the power ratio $\eta$ between the first and second pump pulses, the interaction lengths $\Delta L1$ and $\Delta L2$ between the probe pulse and the first and second pump pulses, and the relative time differences $\Delta T1$ and $\Delta T2$ between the probe pulse and the first and second pump pulses, any Brillouin amplification gain can be applied from any spot to any mode of the backscattered light of the probe pulse.

Figure 5:
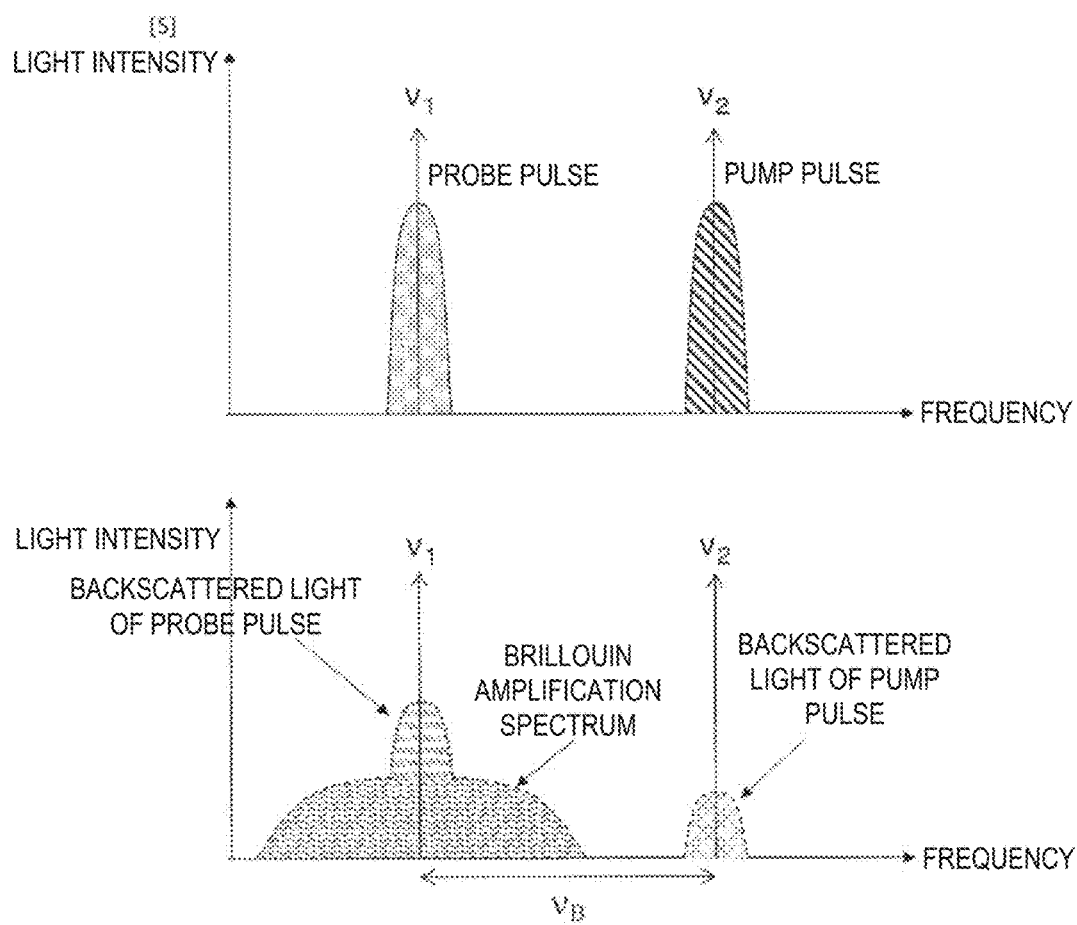
FIG. 5 is a diagram illustrating an optical frequency arrangement of light by the backscattered light amplification device according to the present invention.

FIG. 5 schematically shows a frequency arrangement relation of the probe pulse, the pump pulse, the backscattered light generated by each of the pulse, and the Brillouin gain spectrum generated by the pump pulse.

The Rayleigh backscattered light generated by the probe pulse has the same optical frequency v1 as the probe pulse. For the pump pulse having the optical frequency v2, the Brillouin gain spectrum occurs around v2−vB downshifted by a Brillouin frequency shift vB of the fiber under test FUT. When the frequency v1 of the probe pulse is within the Brillouin gain spectrum (approximately, several tens of MHz), the backscattered light of the probe pulse is subjected to Brillouin amplification in the fiber under test FUT.

Figure 6:
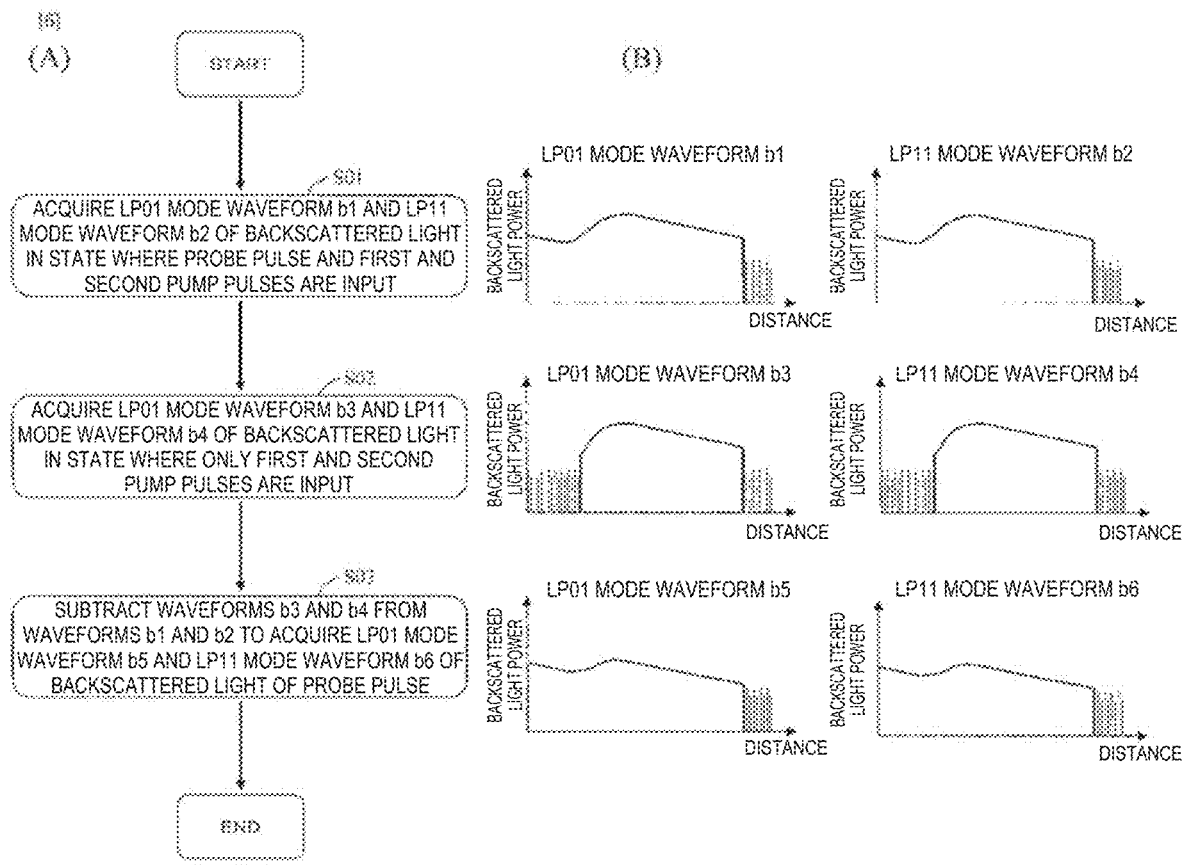
FIG. 6 is a flowchart illustrating an optical pulse test method according to the present invention.

FIG. 6 is a flowchart illustrating a waveform analysis procedure in the arithmetic processor 1-22.

First, in step S01, an LP01 mode waveform b1 and an LP11 mode waveform b2 of the backscattered light are acquired in a state where the probe pulse and the first and second pump pulses are input. The waveforms b1 and b2 observed at this time are defined as $F_G^{01}(z)$ and $F_G^{11}(z)$, respectively.

Next, in step S02, an LP01 mode waveform b3 and an LP11 mode waveform b4 of the backward Brillouin scattered light having no stimulated component generated only by the pump pulse are acquired in a state where only the first and second pump pulses are input. The waveforms observed at this time are defined as $F_P^{01}(z)$ and $F_P^{11}(z)$ respectively.

Finally, in step S03, the differences b1-b3 and b2-b4 of these waveforms are taken, and thus it is possible to acquire and analyze an LP01 mode waveform $F_R^{01}(z)$ and an LP11 mode waveform $F_R^{11}(z)$ of the amplified Rayleigh backscattered light of the probe pulse.

The waveform $F_R^{01}(z)$ and the waveform $F_R^{11}(z)$ are obtained using Formulas (8) and (9) as a function of the length direction z of the fiber under test FUT.

[Note]

The optical pulse test device according to the present invention will be described below.

(Problem)

The present invention is to enable the backscattered light of a plurality of propagation modes propagating in the optical fiber to be individually amplified by the stimulated Brillouin scattering.

(Means)

In order to solve the above problem, the optical pulse test apparatus includes:

a first light source configured to output probe light having a wavelength that can propagate in a fundamental mode and a first higher-order mode of a fiber under test FUT;

an optical splitter configured to split the light output from the first light source into probe light and local oscillation light;

a pulser configured to pulse the probe light to generate a probe pulse;

a second light source configured to output pump light having a wavelength shifted by a Brillouin frequency shift to a shorter wavelength than the probe light;

a variable optical splitter configured to split the pump light at a desired splitting ratio;

second and third pulsers configured to pulse the pump light split by the variable optical splitter to generate first and second pump pulses;

a signal generator configured to generate an electric pulse train used to control the first, second, and third pulsers;

an optical multiplexer configured to multiplex the probe pulse and a first pump pulse;

a first optical circulator configured to separate a fundamental mode component of backscattered light from the fiber under test FUT;

a second optical circulator configured to separate a first higher-order mode component of the backscattered light from the fiber under test FUT;

a mode multiplexer/demultiplexer configured to make the multiplexed probe pulse and the first pump pulse incident on the fiber under test FUT in one of the fundamental mode and the first higher-order mode and in the other of a second pump pulse fundamental mode and the first higher-order mode, and to separate the backscattered light from the fiber under test FUT into the fundamental mode and the first higher-order mode;

an optical multiplexer configured to multiplex the light emitted from the first light source split by the optical splitter with the fundamental mode component and the first higher-order mode of the backscattered light, respectively;

first and second balanced-type photodetectors configured to photoelectrically convert the multiplexed light;

first and second A/D converters configured to convert photocurrents output from the first and second photodetectors into voltages, respectively; and an arithmetic processing unit configured to acquire an intensity distribution of the fundamental mode component of the backscattered light with respect to a distance of the fiber under test FUT and an intensity distribution of the first higher-order mode component of return light with respect to a distance of the fiber under assumption.

The pump light has a wavelength shifted by a Brillouin frequency shift to a shorter wavelength than a probe light source. The optical pulse test apparatus controls the first and second pump pulses excited in a mode-selective manner to an arbitrary optical power ratio, a pulse width, and a relative time delay with respect to the probe pulse using the variable optical splitter, the second and third pulsers, and the mode multiplexer/demultiplexer according to claim 1, and amplifies the fundamental mode and the first higher-order mode of Rayleigh backscattered light of a probe pulse previously incident on the fiber under test FUT from a desired spot with a desired gain.

The arithmetic processor is configured to:
acquire a backscattered light waveform in first measurement in a state where the probe pulse and the first and second pump pulses are incident on the fiber under test FUT;
acquire backscattered light waveforms of the first and second pump pulses in second measurement in a state where the probe pulse is not incident on the fiber under test FUT; and
calculate a Rayleigh backscattered light waveform of the probe pulse from a difference between the waveform acquired in the first measurement and the waveforms acquired in the second measurement.

Effects of the Invention

According to the optical pulse test apparatus and the optical pulse test method of the present invention, the conditions (input mode, input power, input timing, and pulse width) of the pump light to be input are controlled in the optical fiber where a plurality of propagation modes exist or in the optical fiber where each of the pulses is in a wavelength region in which the plurality of propagation modes propagate, and thus the stimulated Brillouin scattering can be used to amplify a desired propagation mode of the Rayleigh backscattered light with a desired gain from a desired spot.

In the present embodiment described above, the fiber under test propagates only two propagation modes of the fundamental mode and the first higher-order mode, and the propagating light is in a single polarization state. However, even when the fiber under test can propagate three or more propagation modes and the propagating light is in a single polarization state, similarly, the desired propagation mode of the Rayleigh backscattered light can be amplified with a desired gain from a desired spot by the control of the conditions of the pump light to be input.

REFERENCE SIGNS LIST

1-1 First light source
1-2, 1-3 Optical splitter
1-4 First optical pulser
1-5 Second light source
1-6 Variable optical splitter
1-7, 1-8 Second and third pulser
1-9 to 1-11 Electric pulse generator
1-12 Optical multiplexer
1-13, 1-14 Optical circulator
1-15 Mode multiplexer/demultiplexer
1-16, 1-17 Optical multiplexer
1-18, 1-19 Balanced-type photodetector
1-20, 1-21 A/D converter
1-22 Arithmetic processor
10 Backscattered light amplification device
11 Probe pulse incidence means
12 Pump pulse incidence means
13 Control means
20 Arithmetic processing device

The invention claimed is:

1. A backscattered light amplification device comprising:
a probe pulse incidence means for making a probe pulse incident on one end of a fiber under test in a desired propagation mode;
a pump pulse incidence means for making a pump pulse, which generates a Brillouin gain spectrum in an optical frequency range including an optical frequency of the probe pulse, incident on the one end of the fiber under test in a plurality of propagation modes after the probe pulse incidence means makes the probe pulse incident on the fiber under test; and
a control means for setting a power ratio of the pump pulse between the propagation modes, a length of the pump pulse in each of the propagation modes, and a relative time difference between the probe pulse incident on the fiber under test and the pump pulse in each of the propagation modes so as to give a desired Brillouin amplification gain to backscattered light of a desired propagation mode generated at a spot distal from a desired spot of the fiber under test, among backscattered light of a plurality of propagation modes generated from the probe pulse propagating in the fiber under test.

2. The backscattered light amplification device according to claim 1, further comprising:
a mode demultiplexing means for separating the backscattered light returning to the one end of the fiber under test for each propagation mode.

3. An optical pulse test apparatus comprising:
the backscattered light amplification device according to claim 2; and
an arithmetic processing device that acquires, for each propagation mode, a light intensity distribution in a length direction of the fiber under test from the backscattered light returning to the one end of the fiber under test, wherein
the arithmetic processing device is configured to
operate the backscattered light amplification device to acquire a first light intensity distribution when the probe pulse and the pump pulse are incident on the fiber under test,
operate the pump pulse incidence means and the mode demultiplexing means of the backscattered light amplification device to acquire a second light intensity distribution when only the pump pulse is incident on the fiber under test, and
subtract, for each propagation mode, the second light intensity distribution from the first light intensity distribution to acquire a third light intensity distribution that would occur when only the probe pulse is incident on the fiber under test.

4. A backscattered light amplification method comprising:
a probe pulse incidence procedure for making a probe pulse incident on one end of a fiber under test in a desired propagation mode;
a pump pulse incidence procedure for making a pump pulse, which generates a Brillouin gain spectrum in an optical frequency range including an optical frequency of the probe pulse, incident on the one end of the fiber under test in a plurality of propagation modes after the probe pulse is incident on the fiber under test in the probe pulse incidence procedure; and
a control procedure for setting a power ratio of the pump pulse between the propagation modes, a length of the pump pulse in each of the propagation modes, and a relative time difference between the probe pulse incident on the fiber under test and the pump pulse in each of the propagation modes so as to give a desired Brillouin amplification gain to backscattered light of a desired propagation mode generated at a spot distal from a desired spot of the fiber under test in the pump pulse incidence procedure, among backscattered light of a plurality of propagation modes generated from the probe pulse propagating in the fiber under test.

5. The backscattered light amplification method according to claim 4, further comprising:
a mode demultiplexing procedure for separating the backscattered light returning to the one end of the fiber under test for each propagation mode.

6. An optical pulse test method of performing:
the backscattered light amplification method according to claim 5; and
an arithmetic processing method of acquiring, for each propagation mode, a light intensity distribution in a length direction of the fiber under test from the backscattered light returning to the one end of the fiber under test, the optical pulse test method comprising of:
using the backscattered light amplification method and the arithmetic processing method to acquire a first light intensity distribution when the probe pulse and the pump pulse are incident on the fiber under test;
using the pump pulse incidence procedure and the mode demultiplexing procedure of the backscattered light amplification method and the arithmetic processing method to acquire a second light intensity distribution when only the pump pulse is incident on the fiber under test; and
subtracting, for each propagation mode, the second light intensity distribution from the first light intensity distribution to acquire a third light intensity distribution that would occur when only the probe pulse is incident on the fiber under test.

* * * * *